US008943256B1

(12) United States Patent
Landry et al.

(10) Patent No.: US 8,943,256 B1
(45) Date of Patent: Jan. 27, 2015

(54) SERIAL DATA INTERMEDIARY DEVICE, AND RELATED SYSTEMS AND METHODS

(71) Applicant: Cypress Semiconductor Corporation, San Jose, CA (US)

(72) Inventors: Gregory J. Landry, Merrimack, NH (US); Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 14/133,359

(22) Filed: Dec. 18, 2013

Related U.S. Application Data

(60) Provisional application No. 61/863,778, filed on Aug. 8, 2013, provisional application No. 61/877,758, filed on Sep. 13, 2013.

(51) Int. Cl.
*G06F 13/36* (2006.01)
*G06F 13/38* (2006.01)
(Continued)

(52) U.S. Cl.
CPC .......... *G06F 13/4027* (2013.01); *G06F 13/404* (2013.01); *G06F 13/4282* (2013.01); *G06F 13/4045* (2013.01); *G06F 13/385* (2013.01); *G06F 13/4054* (2013.01); *G06F 13/4004* (2013.01); *G06F 2213/0016* (2013.01); *G06F 2213/0052* (2013.01)
USPC ................. 710/314; 710/64; 710/70; 710/72; 710/300; 710/311; 710/313

(58) Field of Classification Search
CPC ................ G06F 2213/0016; G06F 2213/0052; G06F 13/385; G06F 13/4004; G06F 13/4027; G06F 13/404; G06F 13/4045; G06F 13/4054; G06F 13/4282
USPC ........ 710/110, 64, 70, 72, 300, 311, 313, 314
See application file for complete search history.

(56) References Cited

U.S. PATENT DOCUMENTS 5,892,933 A * 4/1999 Voltz ............................ 710/316
6,233,635 B1 * 5/2001 Son ............................... 710/315
(Continued)

FOREIGN PATENT DOCUMENTS

CN          101046789 A     10/2007
CN          102375749 A     3/2012

OTHER PUBLICATIONS

English language bibliographic data for CN 101046789, Oct. 3, 2007.
(Continued)

*Primary Examiner* — Ryan Stiglic

(57) ABSTRACT

An integrated circuit (IC) device can include a serial communication first interface (I/F) circuit electrically coupled to first physical connections of the IC device, and configured to respond to communication signals received at the first physical connections; at least one serial communication second interface (I/F) circuit electrically coupled to second physical connections of the IC device, and configured to enable data transactions over the second physical connections; and a repeater circuit configured to bypass the first I/F circuit and enable serial communication signals to be transmitted from the first physical connections to the second physical connections. Systems including such an IC device and related methods are also disclosed.

19 Claims, 9 Drawing Sheets

(51) Int. Cl.
*G06F 13/40* (2006.01)
*G06F 13/42* (2006.01)

(56) References Cited

U.S. PATENT DOCUMENTS

| | | | |
|---|---|---|---|
| 6,339,806 B1 * | 1/2002 | Foster et al. | 710/313 |
| 6,816,939 B2 * | 11/2004 | Bandholz et al. | 710/305 |
| 6,842,806 B2 * | 1/2005 | Ervin | 710/110 |
| 6,851,001 B1 * | 2/2005 | Oudet | 710/104 |
| 6,874,050 B2 * | 3/2005 | Tangen | 710/300 |
| 6,928,501 B2 * | 8/2005 | Andreas et al. | 710/110 |
| 7,010,639 B2 * | 3/2006 | Larson et al. | 710/311 |
| 7,016,981 B2 * | 3/2006 | Ervin | 710/1 |
| 7,092,041 B2 * | 8/2006 | Lendaro | 348/705 |
| 7,222,339 B2 | 5/2007 | Rothman et al. | |
| 7,284,079 B2 * | 10/2007 | Ervin | 710/110 |
| 7,398,345 B2 * | 7/2008 | Larson et al. | 710/306 |
| 7,441,065 B2 * | 10/2008 | Lyle | 710/310 |
| 7,444,453 B2 * | 10/2008 | Ellison | 710/311 |
| 7,630,304 B2 * | 12/2009 | Larson et al. | 370/229 |
| 7,689,756 B2 * | 3/2010 | Ellison | 710/311 |
| 7,793,022 B2 * | 9/2010 | Travers et al. | 710/110 |
| 7,882,282 B2 * | 2/2011 | Haban et al. | 710/38 |
| 8,067,948 B2 | 11/2011 | Sequine | |
| 8,132,015 B1 | 3/2012 | Wyatt | |
| 8,151,029 B2 * | 4/2012 | Haban et al. | 710/316 |
| 2003/0212847 A1 * | 11/2003 | Bandholz et al. | 710/305 |
| 2004/0036808 A1 * | 2/2004 | Lendaro | 348/725 |
| 2004/0255071 A1 * | 12/2004 | Larson et al. | 710/306 |
| 2008/0307157 A1 | 12/2008 | Jang et al. | |
| 2009/0153574 A1 | 6/2009 | Chou et al. | |
| 2009/0222807 A1 | 9/2009 | Fu et al. | |
| 2009/0292843 A1 * | 11/2009 | Haban et al. | 710/110 |
| 2010/0191867 A1 | 7/2010 | Douglas et al. | |
| 2010/0205326 A1 | 8/2010 | Deshpande et al. | |
| 2011/0099310 A1 * | 4/2011 | Haban et al. | 710/110 |
| 2011/0179201 A1 * | 7/2011 | Monks et al. | 710/60 |
| 2011/0302344 A1 * | 12/2011 | Bell et al. | 710/110 |
| 2012/0311211 A1 * | 12/2012 | Gao | 710/110 |
| 2013/0055229 A1 | 2/2013 | Tung et al. | |

OTHER PUBLICATIONS

English language bibliographic data for CN 102375749, Mar. 14, 2012.

NXP Semiconductors, PCA9515A I2C-bus repeater Product data sheet, Mar. 23, 2012.

\* cited by examiner

SERIAL DATA INTERMEDIARY DEVICE, AND RELATED SYSTEMS AND METHODS

This application claims the benefit of U.S. provisional patent application Ser. No. 61/863,778 filed on Aug. 8, 2013, and Ser. No. 61/877,758 filed on Sep. 13, 2013.

TECHNICAL FIELD

The present disclosure relates generally to integrated circuit (IC) devices having serial data inputs/outputs (I/Os), and more particularly to IC devices that can serve as intermediary devices between multiple other devices operating according to a same serial or different serial communications protocol.

BACKGROUND

Some electronic systems include a serial data communication interface to communicate between different integrated circuits (ICs) in a system. One such serial data communication interface can be the I2C (Inter-IC Interface) created by NXP Semiconductor.

One such conventional system 1000 is shown in FIG. 10. In the conventional system 1000, a host processor 1001 may communicate with an intermediary I2C device 1003 over a host I2C bus 1005. The intermediary I2C device 1003 can, in turn, communicate with several downstream (DS) devices 1009-0 to 1009-n on a separate "downstream" I2C bus 1007. The intermediary I2C device 1003 may be used to consolidate information from the DS devices (1009-0 to 1009-n) such that the host processor 1001 is relieved of the burden of communicating with each DS device (1009-0 to 1009-n) independently. More particularly, an I2C master circuit 1023 can consolidate data from the DS devices (1009-0 to 1009-n) for transmission to host processor 1001 via an I2C slave circuit 1017. In an alternate embodiment intermediary I2C device 1003 may operate as an off-line processing device, interrogating and responding to the attached downstream devices as needed. This allows the host processor 1001 to remain in a powered down or inactive state until specific conditions or events occur that require communication with the host processor 1001.

In such a conventional system 1000, both the intermediary I2C device 1003 and DS devices (1009-0 to 1009-n) may require in-system firmware updates using "bootloading". Bootloading can update system firmware from a host processor 1001 over an established serial communication interface (I/F), such as an I2C interface, rather than using a traditional programming interface which requires pins in addition to those of the serial communication I/F. However, since the host processor 1001 does not have a direct connection to the DS devices (1009-0 to 1009-n), a special method is required to enable bootloading of the downstream DS devices.

One such special method of bootloading DS devices (1009-0 to 1009-n) in a conventional system 1000 can be to include an intermediary processor 1011 that can perform bootloading functions. Therefore, in a conventional system 1000 a host processor 1001 can have a system memory 1013 that includes bootloader code 1015 for executing bootload operations for devices attached to the host I2C bus 1005 (i.e., intermediary I2C device 1003). However, at the same time, an intermediary processor 1011 can have a separate system memory 1019 with its own bootloader code 1021 for executing bootload operations for devices attached to the downstream I2C bus 1007 (i.e., DS devices 1009-0 to 1009-n).

DETAILED DESCRIPTION

Various embodiments will now be described that show an "intermediary" integrated circuit device, and corresponding systems and methods. An intermediary device according to embodiments can be connected, via serial data communication paths, between one or more master devices (e.g., a host) and one or more downstream (DS) devices (e.g., slaves). According to embodiments, an intermediary device can be configurable into a bypass mode, in which serial communication signals can be transferred between first and second serial data physical connections (e.g., pins), bypassing any master or slave interface (I/F) data processing circuits connected to such physical connections.

In particular embodiments, an intermediary device can be reconfigured as a serial data repeater. This can enable a host device (e.g., main processor) to perform bootloading of DS devices, as if such DS devices were directly connected to the main processor. In such an embodiment, no special bootloading functions or timing are needed from the main processor. Further, other than a repeater capability, the intermediary device may have no special bootloading functions.

In other particular embodiments, an intermediary device can be reconfigured as a remapping circuit for multiple DS devices connected to different master I/F circuits of the intermediary device. This can enable a host device to communicate with any of the DS devices, as if such a DS device was directly connected to the host device. In such an embodiment, while DS devices connected to different master I/F circuits can have a same local ID, each DS device can also have a unique global ID, assigned to it by the host device or by the intermediary device.

Figure 1:
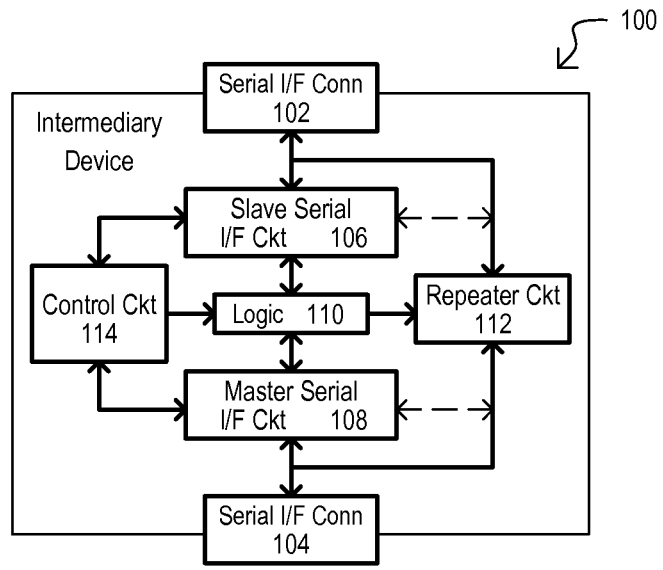
FIG. 1 is a block diagram of an intermediary device according to an embodiment.

FIG. 1 shows an integrated circuit (IC) device 100 according to an embodiment. An IC device 100 can include first physical connections 102, second physical connections 104, a slave I/F circuit 106, a master I/F circuit 108, logic 110, a repeater circuit 112, and a control circuit 114. First and second physical connections (102/104) can be physical connections for receiving electrical signals from another integrated circuit (or other) electronic device. First and second physical connections (102/104) can include any suitable structure, including but not limited to: bond pads, leads, pins, balls, bumps, bond wires, optoelectronic couplers, conductive lines of an IC, or traces of a circuit board, etc. It is understood that first and second physical connections (102/104) are dedicated to receiving serial data streams according to a predetermined serial communications interface, including but not limited to the I2C, Serial Peripheral Interface (SPI), Microwire, and IEEE 1394 interfaces. Such serial communications interfaces are provided by way of example. Embodiments disclosed herein can operate according to any suitable serial communication interface.

In one particular embodiment, first and second physical connections (102/104) can each include one serial data connection and one clock connection. That is, such physical connections (102/104) are compatible with a two-wire bus, such as those operating according to the I2C interface.

A slave I/F circuit 106 can enable the IC device 100 to operate as a bus slave device with respect to a serial connection at first physical connection 102. Similarly, a master I/F circuit 108 can enable the IC device 100 to operate as a bus master with respect to a serial connection at second physical connection 104. Thus, it is understood that both slave and master I/F circuits (106/108) can perform processing on data received over the corresponding physical connections (102/104) and/or on data to be sent over the corresponding physical connections (102/104). Such processing can include, but is not limited to, level translation, buffering, de-serializing, extracting data from fields, protocol translation, address mapping, etc.

Logic 110 can enable data transfers between slave I/F circuit 106 and master I/F circuit 108. After data has been processed by slave I/F circuit 106 it can be transferred to the master I/F circuit 108, and vice versa. Logic 110 can enable data to be consolidated before being transferred from slave master I/F circuit 108 to slave I/F circuit 106, and vice versa.

A repeater circuit 112 can be connected between first and second physical connections (102/104). A repeater circuit 112 can enable signal paths for serial communication signals between first and second physical connections (102, 104). In some embodiments, repeater circuit 112 can repeat signals received at first physical connection 102 on second physical connection 104, and vice versa.

In other embodiments, a repeater circuit 112 can include, or work in conjunction with, circuits (e.g., buffers) included within slave I/F circuit 106 and/or master I/F circuit 108. However, data processing circuits of such I/F circuits are not used. Such an embodiment is represented by the dashed lines in FIG. 1. In other embodiments a repeater circuit 112 may provide an analog signal path that does not include any data buffering or other repeater circuits. Thus, a repeater circuit 112 can be conceptualized as providing a direct path between physical connections (102/104) that bypasses both the slave and master I/F circuits (106/108). In some embodiments, a repeater circuit 112 can be formed by programmable logic circuits, which can be configured into a repeater circuit 112 in response to configuration data and control signals.

In the particular embodiment shown, an IC device 100 can also include a control circuit 114. A control circuit 114 can enable an IC device 100 to switch between a number of different modes by enabling or disabling the slave I/F circuit 106, master I/F circuit 108, and repeater circuit 112. In a particular embodiment, in an intermediary mode of operation, control circuit 114 can enable slave I/F device 106 and master I/F device 108, while disabling repeater circuit 112. In a bypass mode of operation, control circuit 114 can disable slave I/F device 106 and master I/F device 108, while enabling repeater circuit 112.

Figure 2:
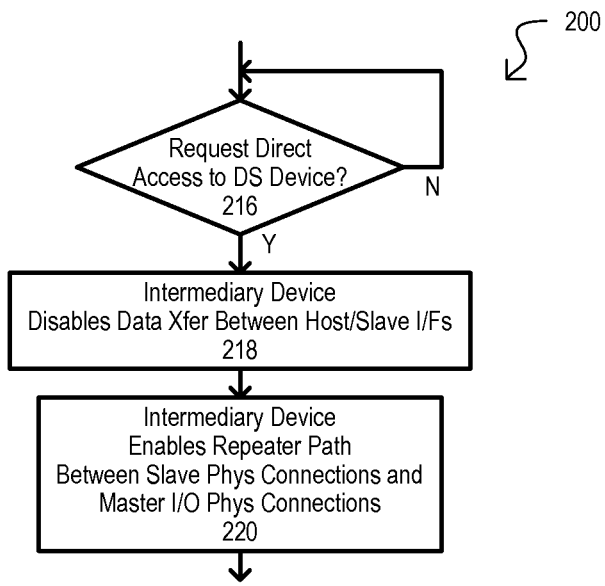
FIG. 2 is a flow diagram of a method according to an embodiment.

FIG. 2 is a flow diagram showing a method 200 according to an embodiment. A method 200 can include determining if a request for direct access of a DS device has been made (216). In particular embodiments, such an action can include receiving a request from another device, such as a host device of a system. If such a request has been received (Y from 216), an intermediary device can suspend (i.e., temporarily disable) data transfers between slave and master I/Fs of the intermediary device (218). It is understood that an intermediary device can be connected between one device (i.e., a host device) and one or more other DS devices (i.e., slave devices), as described herein, or equivalents. Such an action can prevent the intermediary device from operating in a conventional fashion, such as operating on and forwarding data between serial I/F circuits, polling DS devices for status, responding to interrupts from DS devices, and sending data to or from DS devices.

A method 200 can further include the intermediary device enabling a repeater path between slave physical connections and master physical connections 220. In some embodiments, such an action can create a signal repeater path that can enable serial communications between one device (e.g., a host device) and another device (e.g., a slave device) through the intermediary device such that the devices can operate as if the intermediary device did not exist. Such an action can result in a signal path that bypasses the slave and master I/F circuits.

While embodiments can include intermediary devices with bypass signal paths to enable any suitable operations between devices, in particular embodiments, an intermediary device can enable one device (e.g., a host device) to perform bootload operations on a downstream device via a bypass path within an intermediary device.

In some embodiments, during a bootloading operation an intermediary device can be reconfigured as a serial data signal repeater. This can allow another system master (e.g., host device) to perform bootloading on downstream devices as if the downstream devices were directly connected to the master. As a result, no special bootloading functions or timing may be needed by the system master. Within the intermediary device, other than the repeater circuits, no special bootloading functions may be included. Particular examples of such embodiments are described in detail below.

Figure 3:
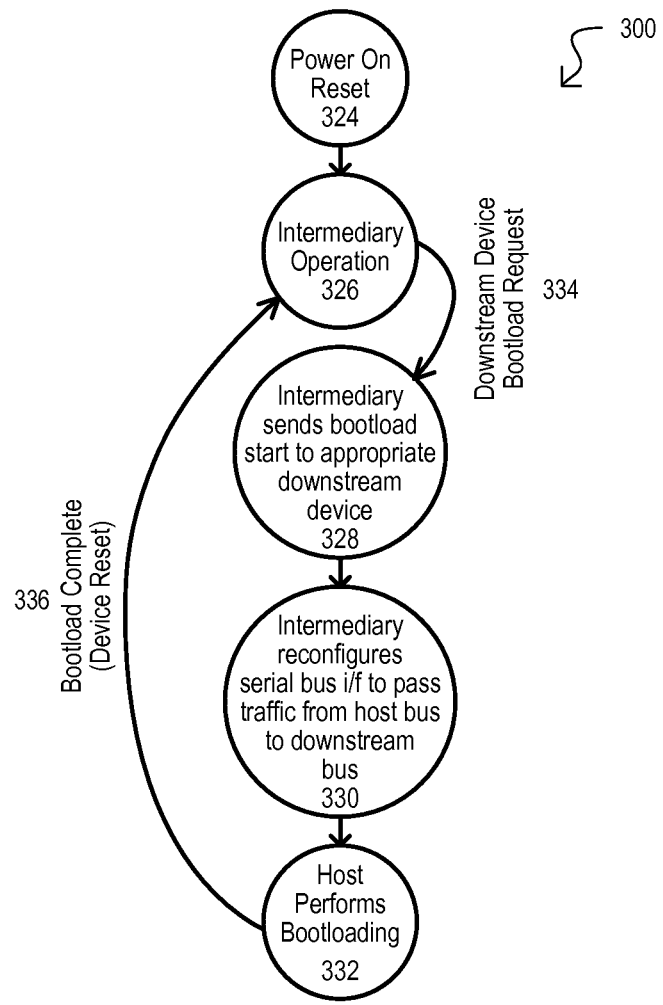
FIG. 3 is a state diagram of bootload operations according to an embodiment.

FIG. 3 is a state diagram showing a system operation 300 according to one particular embodiment. A system operation 300 can start in response to a predetermined event. In the embodiment shown, such an event can include a power-on or reset (324). After a power-on or reset, an intermediary device of a system can configure itself and enter an intermediary mode of operation (326). In some embodiments, an intermediary mode of operation can include transferring data between a host device and a slave I/F circuit of an intermediary device according to a serial communication protocol; within the intermediary device, transferring data between a slave I/F circuit and one or more master I/F circuits; and transferring data between the master I/F circuit(s) and downstream devices according to their associated serial data communication protocol.

If a host device connected to the slave I/F of the intermediary device makes a request to bootload one of the downstream devices (334), the intermediary device can send appropriate bootloader start command(s) to the downstream device (328). The intermediary device can then reconfigure itself as a repeater device (330). In the embodiment shown, this can include the intermediary device to reconfigure its slave and master interfaces to pass traffic from a host bus to a downstream bus (i.e., the bus to which the downstream device is connected).

With the intermediary device configured into a repeater device, a host can perform bootloading (332) on the downstream device. In some embodiments, such an action can enable a host to perform bootloading on the downstream device as if the intermediary device did not exist (i.e., as if the downstream device was directly connected to a host serial communication path). In this way, bootloading of a downstream device connected to an intermediary device can be performed by a host device through the intermediary device, and not by the intermediary device itself.

Referring still to FIG. 3, once bootloading completes, an intermediary device can return to normal operation (336). In some embodiments, such an action can include performing a device reset.

Figure 4A:
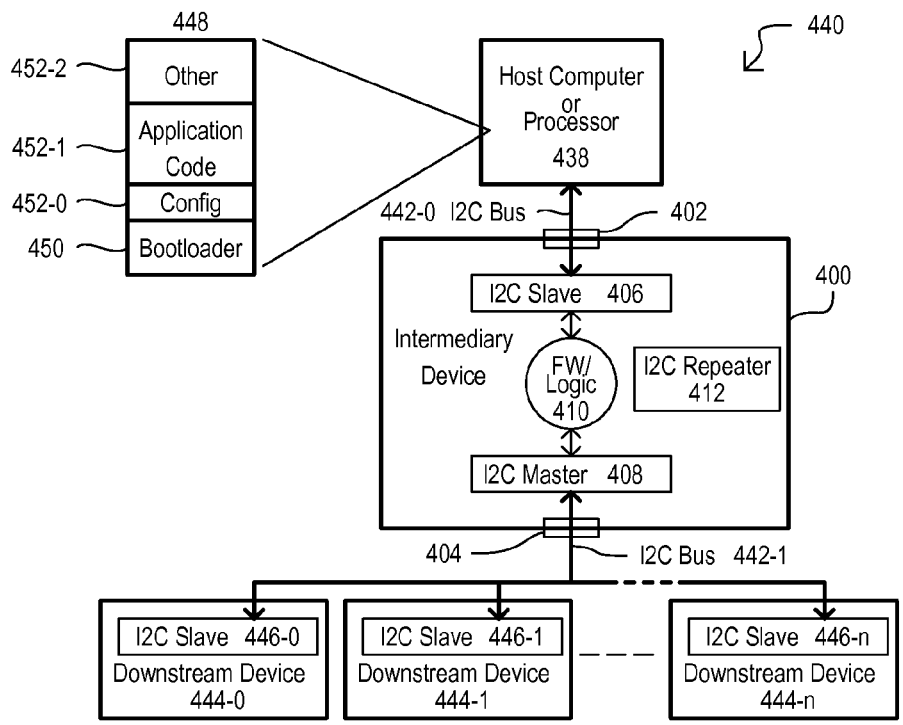
FIGS. 4A and 4B are block diagrams showing systems and modes of operation according to embodiments.
Figure 4B:
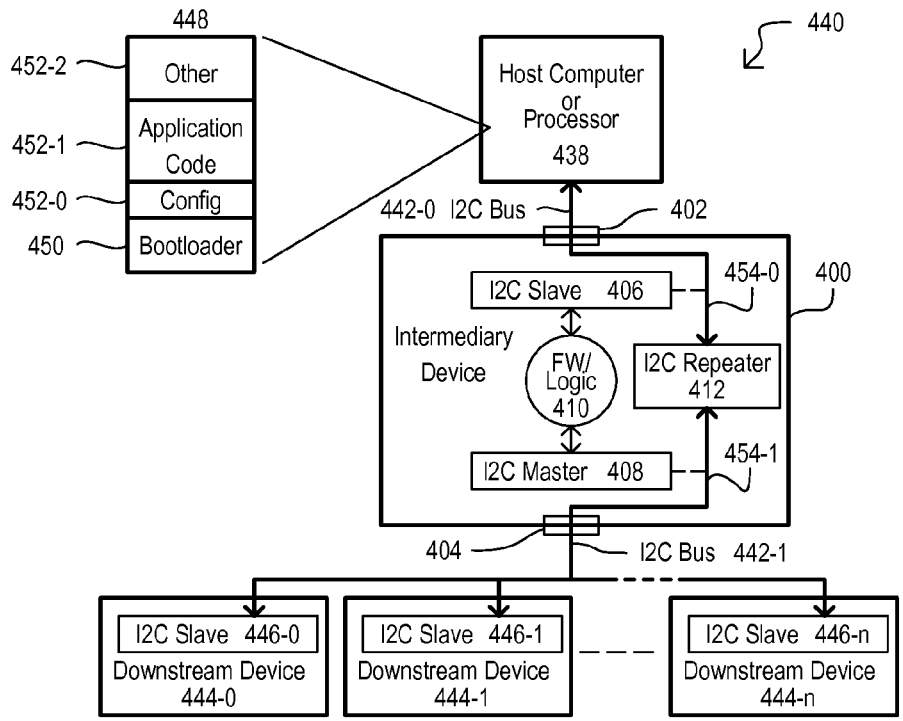

FIGS. 4A and 4B are block schematic diagrams of a system 440 according to one particular embodiment. A system 440 can include a host device 438, an intermediary device 400, and downstream (DS) devices 444-0 to 444-n. A host device 438 can be a master device that can control operations of system 440, and in particular embodiments, can include a host computer or processor. Host device 438 can be connected to intermediary device 400 by way of a host serial bus 442-0. In the particular embodiment, the host serial bus 442-0 can be an I2C compatible bus (i.e., can include a serial data line and a clock line). However, alternate embodiments can have buses having a physical structure and/or operating according to any other suitable communication protocol.

A host device 438 can include memory 448 which can store code for executing various functions as well as holding various non-executable elements such as bit maps, configuration data, and memory images for the associated intermediary and downstream devices. Such code can include bootloading code 450 for bootloading a device via host serial bus 442-0. Other code can include configuration code 452-0 for configuring the system 440, application code 452-1 for executing system applications, and any other appropriate code 452-2. In applications where the operating cores of the intermediary or downstream devices are primarily RAM (random access memory) based, said other appropriate code 452-2 can include code images for these respective devices, which must be bootloaded into them following any loss of power to enable their normal functionality.

Intermediary device 400 can include a slave I/F circuit 406, forwarding logic 410, a master I/F circuit 408, and a repeater circuit 412. A slave I/F circuit 406 can be connected to host serial bus 442-0 through first physical connection 402. Slave I/F circuit 406 can enable intermediary device 400 to operate as slave with respect the host device 438 according the associated communications interface (e.g., I2C). In the particular embodiment shown, slave I/F circuit 406 can be an I2C slave.

A master I/F circuit 408 can be connected to a DS serial bus 442-1 through second physical connections 404. Master I/F circuit 408 can enable intermediary device 400 to operate as master with respect to DS devices (444-0 to -n) according the communications protocol (e.g., I2C). In the particular embodiment shown, master I/F circuit 408 can be an I2C master and DS serial bus 442-1 can be an I2C compatible bus.

Forwarding logic 410 can enable data transfers between slave I/F circuit 406 and master I/F circuit 408. Such functions can allow intermediary device 400 to control operations to various DS devices (444-0 to -n) in response to command data from host device 438, rather than have host device 438 control each DS device (444-0 to -n) individually.

Repeater circuit 412 can receive serial communication signals received on host serial bus 442-0, via first physical connection 402, and repeat such signals on DS serial bus 442-1, via second physical connection 404, and vice versa. In one particular embodiment, a repeater circuit 412 can be created by configuring programmable logic circuits, programmable analog circuits, or a mix thereof.

Each DS device (444-0 to 444-n) can be connected to DS serial bus 442-1 and can operate as slave device with respect to intermediary device 400. Accordingly, each DS device (444-0 to 444-n) can include its own slave I/F circuit (446-0 to -n). In the particular embodiment shown, each DS device slave I/F circuit (446-0 to -n) can be an I2C slave.

FIG. 4A shows a system 440 configured for a normal mode of operation. In a normal mode of operation, an intermediary device 400 can function as a conventional intermediary device. A host device 438 can communicate with intermediary device 400 over host serial bus 442-0 via a slave I/F circuit 406. A host device 438 can be a bus master, with the intermediary device 400 operating as a slave device.

In the normal mode of operation, intermediary device 400 can communicate with the multiple DS devices (444-0 to -n) over DS bus 442-1 using master I/F circuit 408. With respect to the DS serial bus 442-1, the intermediary device 400 is the master and the DS devices (444-0 to 444-n) operate as slaves. The intermediary device 400 can interpret data and messages that are passed to/from the host device 438 and downstream devices (444-0 to 444-n). That is, in the normal mode of operation, data transferred between host device 438 and DS devices (444-0 to 444-n) is processed by slave and master I/F circuits (406/408) of the intermediary device 400. In an alternate normal mode of operation, data may only be transferred between the host device 438 and intermediary device 400, and between intermediate device 400 and DS devices (444-0 to 444-n).

FIG. 4B shows the system 440 re-configured for a bypass mode of operation. In the particular embodiment shown, the bypass operation is a bootloading operation. In response to host device 438 requesting to bootload one of the DS devices (444-0 to 444-n), the intermediary device 400 can send an appropriate start bootloader command to the specified DS device. The intermediary device 400 can then reconfigure itself to operate as a repeater, relaying serial communication signals between the host bus (442-0) and DS serial bus (442-1). In the bypass mode of operation, the intermediary device no longer operates as a master device with respect to the DS devices (444-0 to 444-n). Further, the intermediary device 400 does not perform any processing on data transferred between the host device 438 and the specified DS device. In the bypass mode of operation, host device 438 can now "see" the downstream devices directly, as if they were physically connected to the host serial bus 442-0. The host device 438 is thus able to bootload the specified DS device as if it were directly connected to the host bus 442-0 (i.e., in a conventional fashion). In an alternate embodiment, an intermediary device 400 can reconfigure itself into the bypass mode of operation first, and subsequently a host device 438 can issue a start bootloader command to the corresponding DS device.

Referring still to FIG. 4B, in the embodiment shown, a signal path 454-0 can be created between host serial bus 442-0 and repeater circuit 412, and a signal path 454-1 can be created between DS serial bus 442-1 and repeater circuit 412.

As understood from FIG. 4B, because bootloading of DS devices (444-0 to 444-n) can be performed by a host device 438, an intermediary device 400 does not need to include a bootloading function. This can reduce the complexity of the intermediary device and/or reduce the code and data memory required for the intermediary device as compared to conventional approaches.

It is noted that while some embodiments, in a normal mode a system 440 can operate with a same serial communications protocol on a host bus 442-0 as DS serial bus 442-1, in other embodiments, such buses can operate with different protocols. In such different protocol embodiments, in a bypass mode, a host device 438 can operate (i.e., bootload) with the protocol used on the DS serial bus 442-1 (as opposed to the protocol to communicate with the intermediary device 400 in the normal mode of operation.

An intermediary device according to embodiments herein can take any suitable integrated circuit device form, including a single IC, or multiple ICs formed in one package (e.g., multi-chip module) or mounted on a common substrate. All or a portion of an intermediary device can be formed with custom logic or programmable logic. In one very particular embodiment, an intermediary device can be from the PSoC® family of devices manufactured by Cypress Semiconductor Corporation of San Jose, Calif., U.S.A. Within the PSoC® device, programmable universal digital blocks (UDBs) can be utilized to create a repeater circuit for the intermediate device. In an alternate embodiment using these same devices, a similar connection can be implemented using a programmable analog mux-bus construct which can provide, under firmware or hardware control (e.g., state machine), a direct electrical connection between the upstream port first physical connection 402 and the downstream port second physical connection 404 with no intervening logic. Such use of these analog mux-buses would allow direct electrical connection of the serial interface signals between the host device 438 and the DS devices (444-0 through 444-n).

Figure 5:
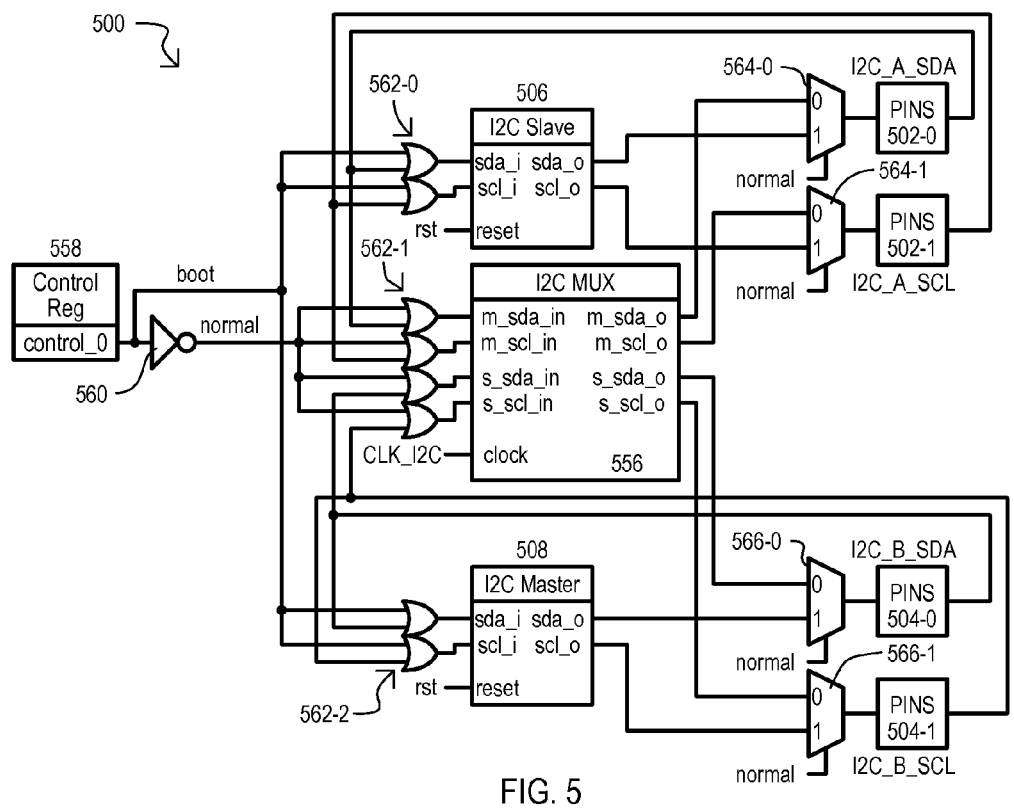
FIG. 5 is a block schematic diagram of an intermediary device according to an embodiment.

FIG. 5 shows a PSoC Creator schematic of a portion of an intermediary device 500 according to one very particular embodiment. PSoC Creator is a design tool produced by Cypress Semiconductor Corporation, which can be used to implement designs within PSoC® devices manufactured by Cypress Semiconductor Corporation. Intermediate device 500 can include first physical connections 502-0/1, second physical connections 504-0/1, a slave I/F circuit 506, master I/F circuit 508, an I/F connection multiplexer (MUX) 556, a control register 558, input logic 562-0/1/2, first MUXs 564-0/1, and second MUXs 566-0/1.

In the particular embodiment shown, intermediary device 500 can have I2C type serial interfaces, thus the first physical connection can include a serial data connection 502-0 and clock connection 502-1. Similarly, the second physical connection can include a serial data connection 504-0 and clock connection 504-1. Slave I/F circuit 506 can implement an I2C slave and master I/F circuit 508 can implement an I2C master.

Connection MUX 556 can include master serial data and clock inputs (m_sda_in, m_scl_in), slave serial data and clock inputs (s_sda_in, s_scl_in), master serial data and clock outputs (m_sda_o, m_scl_o), and slave serial data and clock outputs (s_sda_o, s_scl_o). According to timing provided by a clock signal (CLK_I2C), connection MUX 556 can apply signals received at master serial data and clock inputs (m_sda_in, m_scl_in) to slave serial data and clock outputs (s_sda_o, s_scl_o), and apply signals received at slave serial data and clock inputs (s_sda_in, s_scl_in) to master serial data and clock outputs (m_sda_o, m_scl_o). In an implementation, when the I2C connection MUX 556 is configured to operate as a repeater, the I2C clock signal received at the interface configured as a slave may be used for clocking all internal logic within the associated I2C connection MUX 556, I2C slave I/F circuit 506, and I2C master I/F circuit 508.

A control register 558 can be used to select a mode of operation (bootloading or normal). In the embodiment shown, if control register 558 is set to a logic 1 value, intermediary device 500 can be configured in the bootloading (i.e., bypass) mode of operation, and if it is set to a logic 0 value, intermediary device 500 can be configured in the normal mode of operation.

In the normal mode of operation (Control Reg 558=0), input logic 562-0 can receive a deasserted "boot" signal, and thus can allow inputs (sda_i, scl_i) of slave I/F circuit 506 to be connected to first physical connections 502-0/1. Similarly, input logic 562-2 can allow inputs (sda_i, scl_i) of master I/F circuit 508 to be connected to second physical connections 504-0/1. In addition, first MUXs 564-1/0 can receive an asserted "normal" signal, thus outputs (sda_o, scl_o) of slave I/F circuit 506 can be connected to first physical connections 502-0/1. In the same manner, second MUXs 566-1/0 can connect outputs (sda_o, scl_o) of master I/F circuit 508 to second physical connections 504-0/1. In short, first physical connections 502-0/1 can be connected to slave I/F circuit 506, while second physical connections 504-0/1 can be connected to master I/F circuit 508.

Also in the normal mode of operation, in response to a high "normal" signal, input logic 562-1 can disable all inputs to connection MUX 556 by driving them high. Further, by operation of first and second MUXs (546-0/1, 566-0/1), outputs of connection MUX 556 can be isolated from physical connections 502-0/1, 504-0/1.

In the bootloading (i.e., bypass) mode of operation, input logic 562-0 can receive a high "boot" signal, and thus drive all inputs to slave I/F circuit 506 high, placing it into an idle state. Similarly, input logic 562-2 can receive a high "boot" signal, and place master I/F circuit 508 into an idle state. In addition, first MUXs 564-1/0 can receive a low "normal" signal, isolating slave I/F circuit 506 from first physical connections 502-0/1, while connecting master outputs (m_sda_o, m_scl_o) of connection MUX 556 to first physical connections 502-0/1. In the same manner, second MUXs 566-1/0 can isolate master I/F circuit 508 from second physical connections 504-0/1, while connecting slave outputs (s_sda_o, s_scl_o) of connection MUX 556 to second physical connections 504-0/1.

Also in the bootloading operation mode, in response to a low "normal" signal, input logic 562-1 can enable connection MUX 556 to receive signals on first physical connections 502-0/1 as master inputs (m_sda_in, m_scl_in), and receive signals on second physical connections 504-0/1 as slave inputs (s_sda_in, s_scl_in). In short, by operation of connection MUX 556, signals received on first physical connections 502-0/1 can be output on second physical connections 504-0/1, while signals received on second physical connections 504-0/1 can be output on first physical connections 502-0/1. In a configuration when in bootloading operation mode, such signals may be responsive to the CLK_I2C clock input to the I2C connection MUX 556. In an alternate configuration when also in bootloading operation mode, such signals may be responsive to the I2C_A_SCL clock received at physical connection 502-1.

In some embodiments, all or a portions of the intermediary device 500 can be realized by programming UDB blocks in a PSoC® device. In one particular embodiment, a connection MUX 556, a control register, input logic 562-0/1/2, first MUXs 564-0/1, and second MUXs 566-0/1 can be implemented by programming UDB blocks. In an alternate embodiment, all or portions of the connection MUX 556 within intermediary device 500 can be realized by analog mux buses within a PSoC® device.

In this way, a serial bus (e.g., I2C) repeater function of an intermediary device can be accomplished using programmable circuits (e.g., UDB-based hardware in a PSoC® device). The operation of such a function can require no firmware intervention once it is realized in the programmable circuits. The result is that almost no code is required to enable the repeater function of the intermediary device.

While embodiments can include intermediary devices that provide bypass signal paths to enable bootloading by a host device, other embodiments can utilize like operations for other purposes. In one embodiment, a bypass signal path can enable debugging of DS devices via a slave interface within the intermediary device. Thus, rather than issue bootloading commands, a host device can issue debug commands and receive debug results.

In still other embodiments, an intermediary device can enable a number of devices with a same serial bus address to be accessed by a same master device by a remapping function implemented within the intermediary device. Examples of such embodiments will now be described.

Figure 6A:
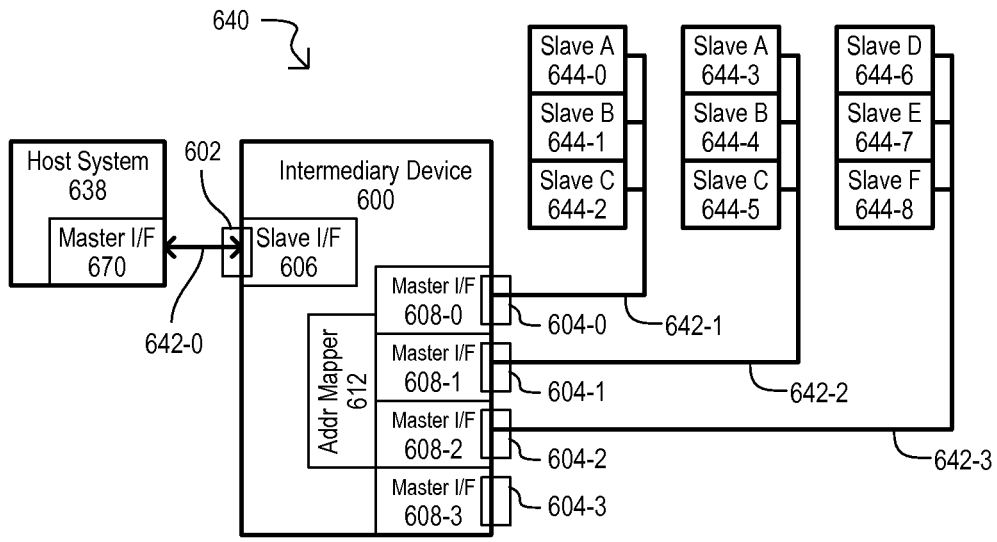
FIGS. 6A and 6B are block schematic diagrams of systems according to other embodiments.

FIG. 6A shows a system 640 according to another embodiment. A system 640 can include a host device 638, an intermediary device 600, and a number of DS devices 644-0 to -8. DS devices (644-0 to -8) can be in groups (three shown in FIG. 6A), with each group of DS devices (644-0 to -8) being connected to a different DS serial bus (642-1 to -3).

According to embodiments, a host device 638 can access any of the DS devices (644-0 to -8), even if DS devices have the same bus address (i.e., same local identification (ID) value). Such fixed IDs are common in fixed-function I2C peripheral devices; e.g., memories, fan controllers, temperature monitors, digital to analog converters (DACs), and real time clocks (RTC). In some embodiments, repeater paths can be created between the host device and different DS buses to enable a host device to access those devices attached to one DS bus. Thus, according to some embodiments, DS devices (644-0 to -8) attached to a same DS bus (642-1 to -3) have different bus addresses, but one or more DS devices (644-0 to -8) attached to different DS buses (642-1 to -3) can have the same bus addresses.

A host device 638 can include a master I/F circuit 670, and can serve as a master for the system 640. Host device 638 can be connected to intermediary device 600 by a host serial bus 642-0.

An intermediary device 600 can have a first physical connections 602, slave I/F circuit 606, an address mapper circuit 612, one or more master I/F circuits (608-0 to -3), and second physical connections 604-0 to -3 corresponding to each master I/F circuit (608-0 to -3). According to an embodiment, address mapper circuit 612 can selectively connect host device 638 to one of the DS buses (642-1 to -3). In particular embodiments, such an action can include address mapper circuit 612 creating a repeater path between first physical connections 602 and the physical connections (i.e., one of 604-0 to -3) corresponding to the target DS bus (642-1 to -3). In such operations, an intermediary device 600 can be conceptualized as being a network address translator/router (NAT/router) for serial communications between host device 638 and DS devices (644-0 to -8).

DS devices (644-0 to -8) can be slave devices with respect to the serial communication protocol executed by host device 638 and intermediary device 600. In the particular embodiment of FIG. 6A, bus ID values (local ID values) for DS devices (644-0 to -8) are shown by letters (i.e., A to F). Thus, ID values for the DS devices 644-0 to -2 attached to DS serial bus 642-1 can be the same as those of DS devices 644-3 to -5 attached to DS serial bus 642-2. Absent remapping operations, such as those described herein, a host device would not be capable of distinguishing DS devices having the same bus address (i.e., could not distinguish 644-0 from 644-3, or 644-1 from 644-4, etc.).

It is understood that while FIG. 6A shows an intermediary device 600 with four master I/F circuits (608-0 to -3) and corresponding second physical connections (604-0 to -3; i.e., four slave ports), a system 640 could include a greater number of slave ports, or smaller number of slave ports, including one slave port.

In some embodiments, an intermediary device 600 can be configured to respond according to a system architecture. In a particular embodiment, if an intermediary device 600 is the only device attached to a host serial bus 642-0, it can be configured to respond (e.g., give an acknowledge (ACK)) to all received bus addresses (i.e., device IDs). Otherwise, intermediary device 600 can be configured to respond only to those DS devices (644-0 to -8) that are to be accessed by a host device 638 by way of the intermediary device 600.

In other embodiments, an intermediary device 600 can include mapping data (e.g., a table) that includes every possible address. For example, if serial bus addresses are 7-bit values, as is the case for I2C, there would be a table entry and associated data values for each of the 128 possible addresses. Each table entry can have a mark indicating the presence of an attached DS device at that address, the specific DS master port to which the associated device is attached, and the local address on that DS bus for the specific device. In an alternate embodiment, so as to conserve memory for such a table, the mapping table may be constructed to include only addresses for which downstream peripherals are present. In such an arrangement, additional slave devices can be attached to the host serial bus 642-0 (and given "unmarked" addresses). In such an embodiment, in response to a selection address corresponding to DS devices (644-0 to -n) attached to the intermediary device 600, the intermediary device can return an ACK (acknowledge), while command/data directed to the other addresses would not be acknowledged (e.g., NACKed).

In addition or alternatively, an address mapper circuit 612 can be programmable by a host device 638 over the host serial bus 642-0. In such an embodiment, a host device 638 can establish a device ID mapping for each attached DS device (644-0 to -8). In such an arrangement, intermediary device 600 would have its own bus address, to allow the host device 638 to communicate with it, in addition to communicating with the DS devices (644-0 to -8).

Referring still to FIG. 6A, if an intermediary device 600 is a programmable device, for example a PSoC® controller, which implements both an I2C slave port (e.g., 602/606) and one or more I2C master ports (e.g., 604-0/608-0 to 604-3/608-3), the intermediary device 600 can be configured by the host device 638 once, via the host serial bus 642-0. As noted above, in such a case an intermediary device 600 can have its own serial bus address (device ID) to allow the host device 638 to interrogate and program it.

In contrast, if the intermediary device 600 is a custom or pre-programmed part, it does not need to be field configurable, and the intermediary device slave port (e.g., 602/606) does not itself require an address. An address mapper circuit 612 can be preconfigured to enable repeater paths to various DS buses (642-1 to -3) based on a target address (i.e., ID) received from the host device 638. However, in such an embodiment, DS devices (644-0 to -8) attached to a same DS bus (642-1 to -3) may not have the same local ID value.

Figure 6B:
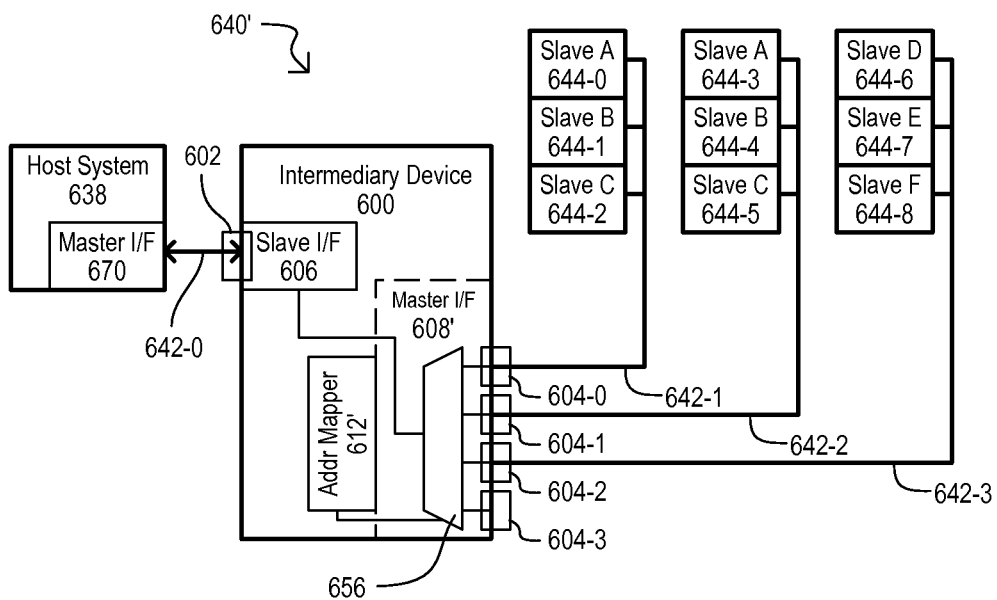

FIG. 6B shows a system 640' according to another embodiment. A system 640' can include items like those of FIG. 6A, and such like items are referred to by the same reference characters. System 640' can differ from that of FIG. 6A in that there can be one master I/F circuit 608', with second physical connections (604-0 to -3) for multiple DS buses (642-1 to -3). That is, multiple DS buses can be served by a single master I/F circuit.

In the embodiment shown, master I/F circuit 608' can include a MUX 656 than can enable a serial communications path between first physical connections (602) or points within slave I/F circuit 606 and any of the second physical connections (604-0 to -3). A host device 638 may only sustain a single transaction through the intermediary device 600 at any instant in time, enabling the use of but one master I/F block 608' for all of the DS buses (642-1 to -3). While one DS bus is active (with serial communications) the remaining DS buses can have their associated bus lines (e.g., serial data and clock lines) at a high impedance state (and pulled high externally).

Figure 7:
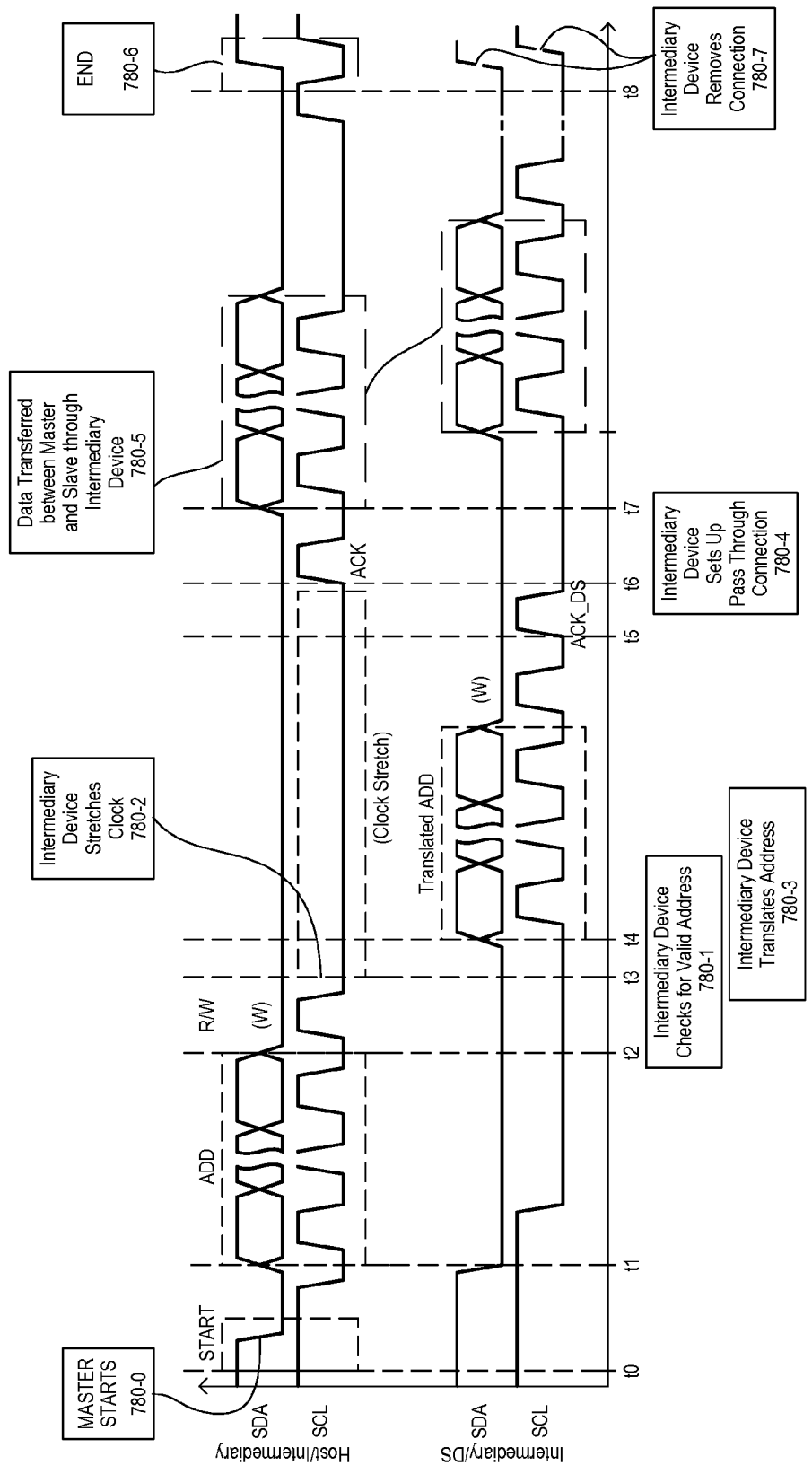
FIG. 7 is a timing diagram showing an address mapping operation according to one particular embodiment.

FIG. 7 is a timing diagram showing an address mapping operation of a system according to one very particular embodiment. The operation of FIG. 7 can be one particular example of an operation performed by a system like that shown in FIGS. 6A/B and 8. In the embodiment of FIG. 7, it is assumed that an intermediary device includes remapping that includes a unique global ID value corresponding to each local ID value and its associated DS master port. In such an arrangement, local ID values of DS devices attached to different DS buses can have the same value. However, global ID values are unique for each DS device.

It is also assumed that a system includes a host device connected to an intermediary device by an I2C host bus, and one or more DS devices connected to the intermediary device by one or more I2C DS buses. An intermediary device can take the form of any of those described herein, or equivalents. The I2C interface is a master/slave serial interface, wherein the master initiates all operations. The I2C protocol and interface use two signals: SDA and SCL. SDA is a bi-directional data signal carried on a serial data line, and SCL is a clock signal carried on a different line. The protocol, timing, and electrical requirements for this interface are documented in V5.0 of the I2C specification, which is controlled and published by NXP Semiconductor.

FIG. 7 shows waveforms for two different buses, each containing a serial data waveform (SDA) and a clock waveform (SCL). One bus can be between a host device and an intermediary device (Host/Intermediary). The other bus can be between the intermediary device and a DS device (Intermediary/DS).

At time t0, a master device can initiate a start condition (780-0).

At time t1, the next bits are always sent by the master, and can include both address and command data. In the particular embodiment shown, a master (e.g., host device) sends a 7-bit address of a slave (in this case a targeted DS device) with which the master wants to communicate. This address can be a global ID value.

At time t2, the 7-bit address is followed by a read/write bit (R/W, which indicates the direction of information travel on the SDA line for the remainder of this transaction). In the example shown, the transaction is write transaction, thus data are transmitted from a host device to a DS device.

According to embodiments, an intermediary device can delay communications on the host serial bus to allow sufficient time to process address/command data and set up the pass through connection. That is, an intermediary device can employ any suitable process to slow transactions. In the particular embodiment of FIG. 7, at time t3, the intermediary device can pull the SCL line low, and keep it low. This is called a clock stretch (780-2). In a clock stretch an I2C slave is allowed to slow down the master when its operation is not fast enough to keep up.

Following time t2 (and/or during the clock stretch), the intermediary device (e.g., I2C NAT/Router) can capture the address value (ADD) and determine whether the address is valid (i.e., corresponds to a DS device) (780-1). If the address corresponds to a DS device, an intermediary device can translate the received address (ADD) into the "real" address (Translated ADD) of the target DS device and apply it to the Intermediary/DS bus, as shown as 780-3 at time t4. In some embodiments, determining if an address is valid can include the intermediary device using the received global address as index to a table having two parts: the local address (i.e., "real" slave address) of the DS device, and the master port of the intermediary device to which that DS device is physically attached.

At time t5, the DS device can acknowledge the address/command. It is understood that if the received address (ADD) did not correspond to a DS device, or the targeted DS device did not respond to its real address, an intermediary device could return a non-acknowledgement (NACK) to the host device.

At time t6, because the DS device responds with an ACK (ACK DS) to its real address, the intermediary device keeps the SDA line low on the Host/Intermediary bus and releases the associated SCL clock line to acknowledge the address and command. At this time, or before this time, the intermediary device can create the pass through connection (780-4), enabling the routing of the associated SDA and SCL signals through the appropriate multiplexor paths as described above. It is understood that embodiments operating according to other serial communication protocols, can employ any suitable serial bus control or delay function to provide time to set up a bypass path, if needed.

With the creation of a connection between the host serial bus and the DS bus by operation of the intermediary device data can then be transmitted between the host device and DS device as if the intermediary device did not exist. In some embodiments, the intermediary device creates a connection between the addressed DS devices SCL and SDA lines, effectively making a circuit having the same functionality as an I2C repeater circuit. This repeater connection can then remain until a STOP condition (or repeated START) is present on the I2C bus.

At time t7, with the pass through connection established, data can be transferred between the host device and the targeted DS device through the intermediary device (780-5). In particular embodiments, this can include employing a signal repeater circuit, as described herein, and equivalents. As noted above, FIG. 7 shows a write operation. In a read operation, the R/W bit would be captured high, and data would originate on the Intermediary/DS bus.

At time t8, a transaction can end (780-6). In the particular embodiment shown, this can include the master system releasing the SDA and SCL signals such that they return high. In some embodiments, an intermediate device can then remove the pass through connection (780-7), enabling the intermediary device to be ready to receive any new host device transactions. In some embodiments, an intermediary device will only release the Intermediary/DS clock signal (SCL') after the host device has released its clock signal (SCL).

As noted above, embodiments can include intermediary devices that are configurable to enable remapping of DS devices having a same local address. According to some embodiments, an intermediary device can include a discovery function. Such a function can discover the local address/ID values and master ports for each DS device, and assign unique global ID values to each such DS device. Such operations will be described with reference to FIG. 6A.

An intermediary device (e.g., I2C NAT/Router) 600 can be addressable by a host device 638. The address of the intermediary device can be configured through the same interface (i.e. 642-0), a secondary interface (i.e., different from the host serial bus 642-0), through a programming of the intermediary device 600, or through other external connections (e.g., pins) to the intermediary device 600.

Upon power-up, or by command from the host device 638, the intermediary device 600 can sequence through all of its master ports (e.g., master I/F circuits (608-0 to -3)) and attempt to address all possible DS devices. In an I2C based system using 7-bit device addresses, there can be 128 addresses. Intermediary device 600 can build internal tables containing the local addresses of all known attached or detected DS devices (644-0 to -8).

A host device 638 can interrogate the intermediary device 600 to get the port/local address map of each attached DS device (644-0 to -8). A host device 638 can then send remapping directions to the intermediary device 600 which will indicate which addresses (i.e., global addresses) it will present to access each identified DS device (644-0 to -8). Intermediary device 600 can populate a data structure (e.g., table) with this information. Once this is complete, a master device (e.g., host device 638) can operate using only the global addresses it assigned to address all of the DS devices (644-0 to -8).

Figure 8:
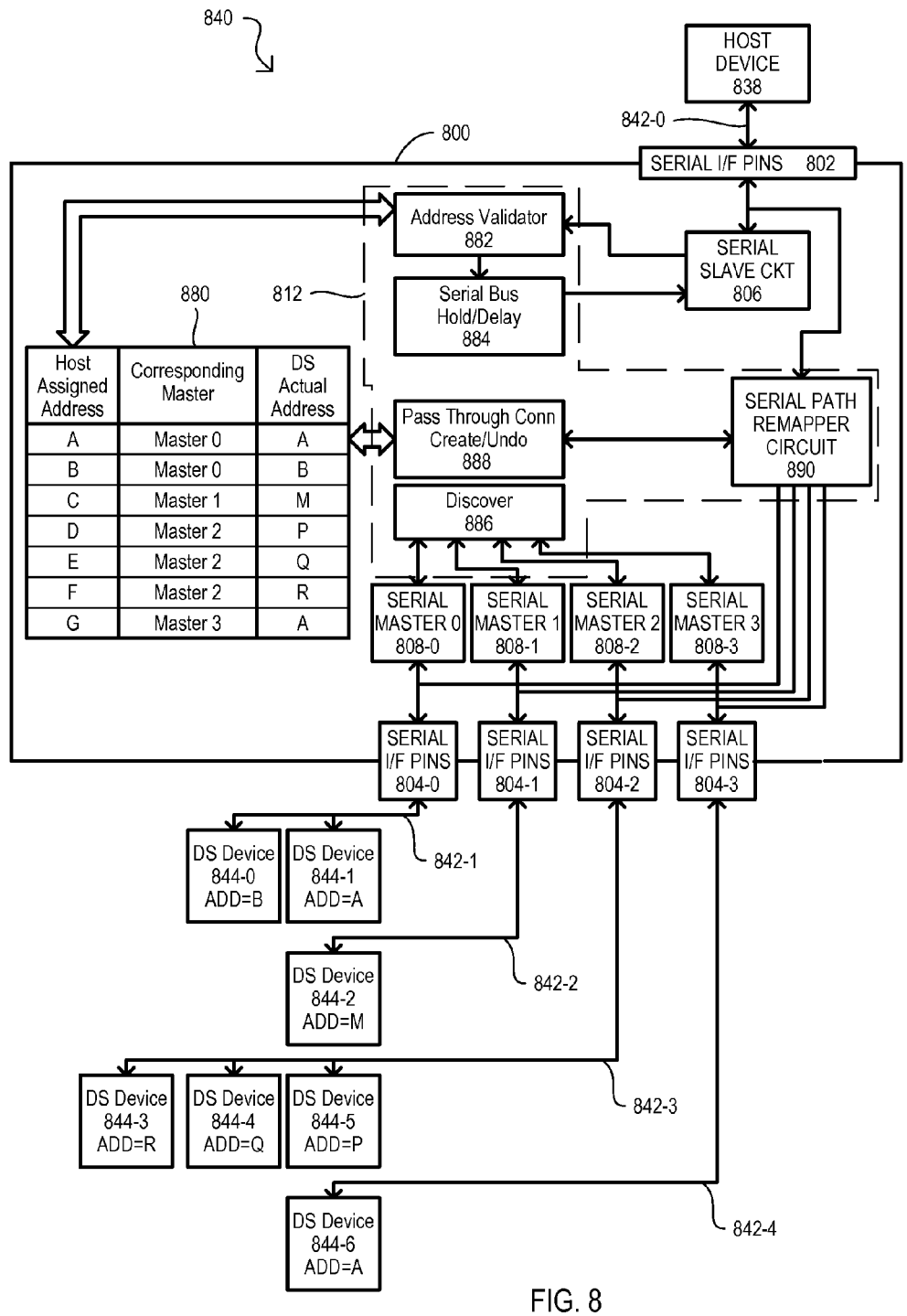
FIG. 8 is a block schematic diagram of a system according to another embodiment.

FIG. 8 is a block schematic diagram of a system 840 according to another embodiment. A system 840 can be one particular implementation of that shown in FIG. 6A. System 840 can include items like those in FIG. 6A, and such like items are referred to by the same reference characters, but with the leading digit being "8" instead of a "6". Like FIG. 6A, a system 840 can include a host device 838, an intermediary device 800, and a number of DS devices 844-0 to -6.

Intermediary device 800 can include a slave I/F circuit 806, multiple master I/F circuits 808-0 to -3, address mapper 812, and memory 880. In some embodiments, intermediary device 800 is configurable into an intermediary mode, as noted above, consolidating data transactions to DS devices (844-0 to -6) by transferring data between slave I/F circuit 806 and master I/F circuits (808-0 to -3) with forwarding logic (not shown). In some embodiments the multiple master I/F circuits 808-0 to -3 are replaced with a single master I/F and associated multiplexers to allow that master to selectively connect to each of the associated serial interface pins 804-0 to -3, as described in FIG. 6B, for example.

Address mapper 812 can include a number functions. An address validator 882 can determine if a received address is present within the intermediary device 800. In one embodiment, address validator 882 can determine if a received address corresponds to a Host Assigned Address stored in memory 880. A serial bus hold/delay 884 can delay communications on host serial bus 842-0 to provide time for the selection of the DS device and creation of a pass through connection between the host device 838 and the desired DS device. A discover function 886 can determine the local address (i.e., DS Actual Address) for each enabled DS device (844-0 to -6), as well as the corresponding master I/F block 808-0 to -3 to which it is attached (i.e., master I/F circuit). The second and third columns shown in memory 880 can be data values generated by a discover function (the first column being generated and provided by host device 838). A pass through connection create/undo function 888 can provide control signals to the associated serial master I/F and serial path remapper circuit 890, to select the targeted DS device and create a desired pass through connection. Serial path remapper circuit 890 can create a serial data path between first physical connection 802 and one of second physical connections (804-0 to -3) to enable data transfers between a desired DS device and host device 838.

A sample operation for the system 840 will now be described. It is assumed that host device 838 issues a read command directed to global address "A". Such data can be processed by slave I/F circuit 806 to extract the address data. Address validator 882 can apply value "A" to the data structure of memory 880 to confirm that it is either for the intermediary device or for a DS device, and to identify Master 0 and local address "A" as corresponding to the received global address. In response to the valid address, serial bus hold/delay 884 can slow communications (e.g., implement a clock stretch) on host serial bus 842-0. In addition, the serial master I/F circuit 808-0 (Master 0) can issue a read command directed to local address (i.e., DS actual address) A.

Following validation of the address and read command by the DS device 844-1 by its transmission of an ACK to the serial master I/F circuit 808-0, and based on the Master 0 data derived from memory 880, pass through connection create/undo function 888 can configure serial path remapper circuit 890 to create a pass through connection from first physical connection 802 to second physical connection 804-0. Once the pass through connection is complete, serial bus hold/delay 884 releases the clock line in bus 842-0 to send the associated ACK to the host device 838. DS device 844-1 can then transmit read data back to host device 838 over such a connection, in response to clocks generated by host device 838. Once such a read operation is complete and the host device 838 sends a stop sequence to the addressed DS device, pass through connection create/undo function 888 can undo the pass through connection.

Figure 9:
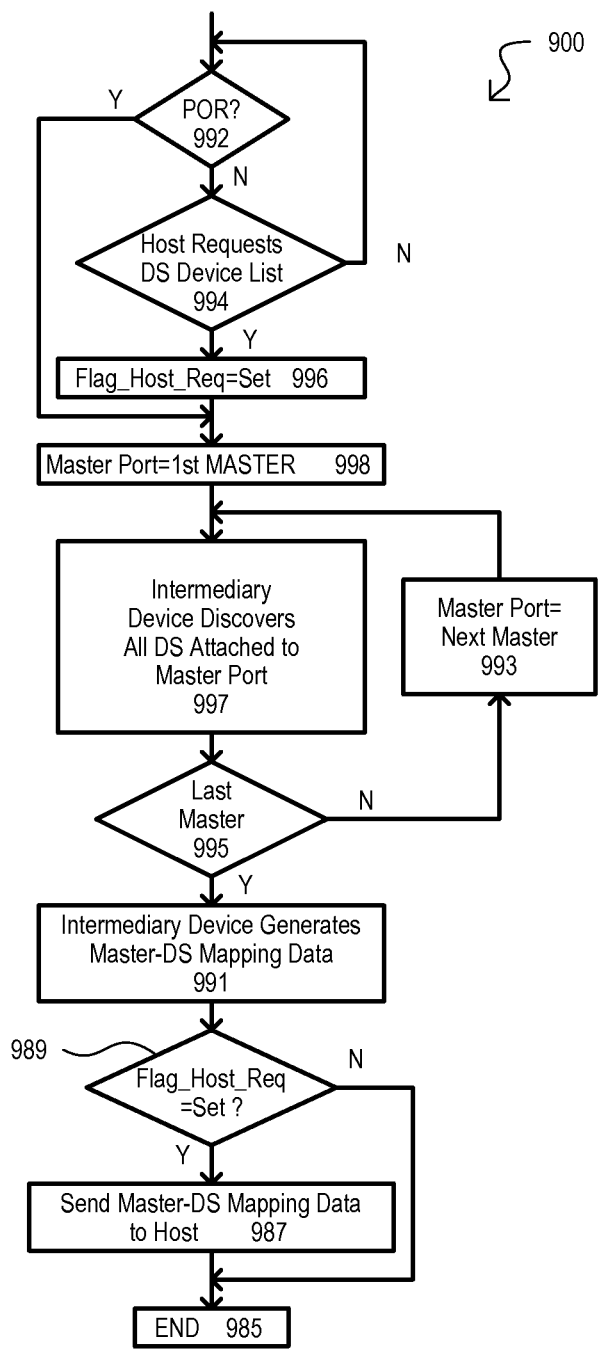
FIG. 9 is a flow diagram of a method according to another embodiment.
Figure 10:
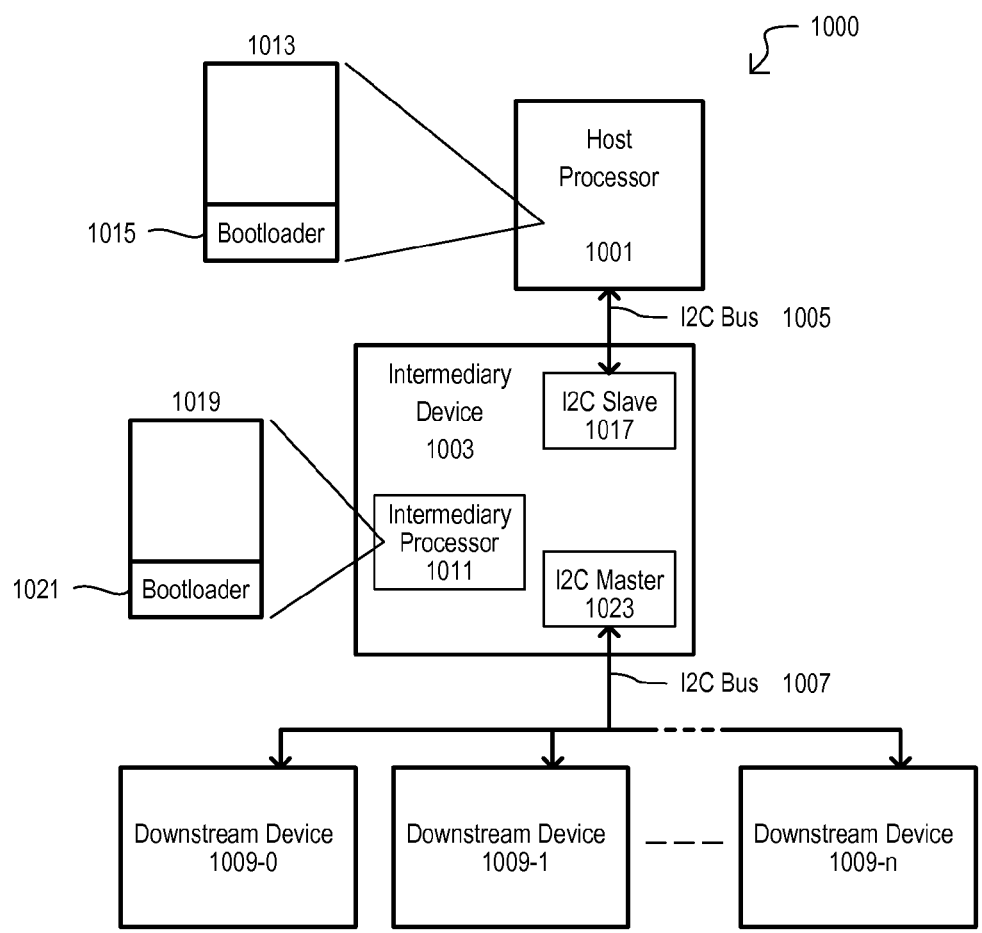
FIG. 10 is a block schematic diagram of a conventional system.

FIG. 9 shows a configuration operation 900 according to another embodiment. In one particular embodiment, an operation 900 can be executed by a system like that shown in FIGS. 6A/B or 8.

In response to a power-on reset (Y from 992), an operation 900 can designate a first master port for examination (998). In response to a host request (Y from 994), an operation can set a request flag (996) and proceed to 998. In particular embodiments, such a host request can be received at a slave I/F circuit of an intermediary device connected to said host.

An intermediary device can discover all enabled DS devices attached to the currently selected master port (997). Such an action can include determining the local address (i.e., ID) for any DS devices attached to the master port. In particular embodiments, such an action can include having the corresponding master I/F circuits interrogate the devices on its DS bus. Once such data has been acquired (or it has been determined no DS devices are attached), an operation can sequence through all remaining master ports (995, 993), performing the discovery operation (997) on each.

After a discovery operation has been performed on a last master port (Y from 995), an operation 900 can generate mapping data that identifies which local addresses correspond to which master port (991). If a request flag is set (e.g., a host device has requested the mapping data) (Y from 989), the mapping data can be sent to the host device (987). If a request flag is not set (e.g., a power-on or reset has occurred) (N from 989) an operation 900 can end (985). Following receipt of the physical mapping of DS devices to associated master I/F ports, the host may analyze the received mapping, and provide a matching set of global IDs to the intermediary device to allow direct communication between the host and the various DS devices.

While embodiments have shown bypass paths (e.g., pass through connections) that can include repeater circuits, in alternate embodiments such paths can be formed by analog routing. That is, a direct wire through the intermediary device could be established instead of using a repeater. In like fashion, the pass through connections may be fully synchronous, using additional clocked data/pipeline stages present within the intermediary device to allow improved speeds and timing margins. Such clocked data can implement read-ahead operations to pre-fetch data from the addressed DS device based on reception of the R/W bit within the initial command from the host device.

It should be appreciated that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An integrated circuit (IC) device, comprising:
a serial communication first interface (I/F) circuit electrically coupled to first physical connections of the IC device, and configured to respond to communication signals received at the first physical connections;
at least one serial communication second interface (I/F) circuit electrically coupled to second physical connections of the IC device, and configured to enable data transactions over the second physical connections, wherein the at least one serial connection second I/F circuit includes a plurality of master I/F circuits, each electrically coupled to a corresponding set of master physical connections of the IC device; and
a bypass circuit configured to bypass the serial communication first I/F circuit and the at least one serial connection second I/F circuit, enable serial communication signals to be transmitted between the first and second physical connections, and to enable serial communication signals to pass between the first physical connections and one of the master physical connections according to mapping data stored on the IC device, wherein the mapping data includes an assigned and unique global ID value for each downstream device connected to the IC device, a local ID value for each downstream device, and the master physical connections to which each downstream device is attached.

2. The IC device of claim 1, wherein:
the first I/F circuit is a slave I/F circuit configured to respond to master communication signals received at the first physical connections; and
the second I/F circuit is a master I/F circuit configured to control data transactions over the second physical connections, wherein
the first and second I/F circuits are operable in response to a serial data signal and a clock signal that is different than the serial data signal.

3. The IC device of claim 1, wherein:
the IC device is configurable between an intermediary mode and a bypass mode; wherein
in the intermediary mode the first I/F circuit processes data received via the first physical connections, and forwards such data to the at least one second I/F circuit, and
in the bypass mode the bypass circuit enables serial communication signals to pass between the first physical connections and the second physical connections.

4. The IC device of claim 3, further including:
a control circuit configured to issue a command via the at least one second I/F circuit to the downstream device prior to the IC device switching to the bypass mode.

5. The IC device of claim 4, wherein:
the command is a bootload start command that places the downstream device into a bootload mode of operation; and
in the bypass mode, the bypass circuit passes bootload signals received at the first physical connections to the downstream device.

6. The IC device of claim 1, further including:
a memory configured to store the global identification (ID) values assigned to each of the downstream devices attached to the master physical connections, wherein
the IC device is operable to:
slow communications over a host serial bus attached to the first physical connections in response to a received command corresponding to one global ID value, and
configure the bypass circuit to enable serial communication signals to be transmitted between a host device attached to the host serial bus and the downstream device corresponding to the global ID value.

7. The IC device of claim 1, further including:
control circuits configured to generate the mapping data that indicates local ID values for downstream devices to corresponding master physical connections, and transmit the mapping data via the first I/F circuit to a host device; and
a memory configured to store remapping data that includes host assigned ID values for each downstream device as well as the mapping data, wherein
downstream devices connected to different master physical connections can have a same local ID value.

8. A system, comprising:
an intermediary integrated circuit (IC) device that includes:
first IC physical connections configured to connect to a host device over a host serial data connection,
second IC physical connections configured to connect to at least one slave device over at least one slave serial data connection,
a serial data first interface (I/F) circuit coupled to the first IC physical connections,
at least one serial data second I/F circuit coupled to the second IC physical connections, and
a bypass circuit configured to bypass the serial data first I/F circuit and the serial data second I/F circuit, and enable serial communication signals to be transmitted between the first IC physical connections and the second IC physical connections, and
mapping data including an assigned ID value for each slave device connected to the intermediary IC device, a local ID value for each slave device, and the second IC physical connections to which each slave device is attached,
wherein the intermediary IC device being configurable between an intermediary mode and a bypass mode.

9. The system of claim 8, wherein:
the first IC physical connections include a serial data connection and a clock connection.

10. The system of claim 8, further including:
the host device coupled to the first IC physical connections that includes a host processor and bootloading code for executing bootloading operations according to a serial communication protocol; and
the at least one slave device coupled to one second I/F circuit of the intermediary IC device via the second IC physical connections,
wherein the intermediary IC device is operable in the bypass mode to enable bootload serial communication signals from the host device to bypass the serial data first I/F circuit and the serial data second I/F circuit of the intermediary IC device and be transmitted to the at least one slave device via the bypass circuit.

11. The system of claim 8, wherein
in the intermediary mode the first I/F circuit processes data received via the first IC physical connections, and forwards such data to the at least one serial data second I/F circuit, and
in the bypass mode the bypass circuit enables serial communication signals be transmitted between the first IC physical connections and one of the second IC physical connections selected according to the mapping data.

12. The system of claim 8, wherein:
the intermediary IC device further includes control circuits configured to:
generate mapping data that includes local ID values for each slave device and the second physical connections to which the slave device is attached, and
transmit the mapping data to the host device over the serial data first I/F circuit of the intermediary IC device.

13. The system of claim 8, wherein:
the bypass circuit comprises programmable circuits configurable to create signal paths for serial communication signals between the first IC physical connections and anyone of the second IC physical connections.

14. A method, comprising:
in an intermediary mode of operation,
processing signals of at least one serial data communications protocol received at first physical connections of an intermediary IC device with a slave interface (I/F) circuit to generate forward data, and
processing the forward data with at least one master I/F circuit connected to second physical connections of the intermediary IC device, wherein each master I/F circuit communicates with slave devices connected to it via the second physical connections based on local identification (ID) values of the slave devices; and
in a bypass mode of operation,
bypassing the slave I/F circuit and the at least one master I/F circuit by repeating signals of the serial data communications protocol received at the first physical connections to the second physical connections, wherein a host device communicates with the slave devices attached to the intermediary IC device based on global ID values assigned to each slave device.

15. The method of claim 14, wherein:
the bypass mode of operation further includes:
sending a bootload start command to the slave device connected to one master I/F circuit of the intermediary device, and
after sending the bootload start command, repeating bootload control signals from the host device received at the first physical connections on the second physical connections corresponding to the one master I/F circuit.

16. The method of claim 14, wherein:
the local ID values are unique for the slave devices connected to the same master I/F circuit, but not necessarily unique among all of the slave devices, and
the global ID values are unique among all of the slave devices.

17. The method of claim 16, further including:
sending mapping data to the host device via the slave I/F circuit that includes the local ID value for each slave device, as well as the second physical connections to which the slave device is attached;
and
receiving the global ID value for each slave device from the host device.

18. The method of claim 16, wherein:
in the bypass mode of operation,
receiving a serial data command from the host device on a host serial bus connected to the first physical connections, and
comparing an identification (ID) value of the received serial data command to a list of the global ID values, wherein
the slave devices are connected to the second physical connections, each slave device including the local ID value and the global ID value.

19. The method of claim 18, further including:
if the received ID value does not match any global ID value, enabling a non-acknowledgement of the command,
if the received device ID value matches the global ID value, delaying communications on the host serial bus while a bypass path is configured between the first physical connections and the second physical connections.

* * * * *